Aug. 11, 1931.  L. A. PARADISE  1,818,742
APPARATUS FOR CLEANING AIR
Filed May 5, 1924   2 Sheets-Sheet 1
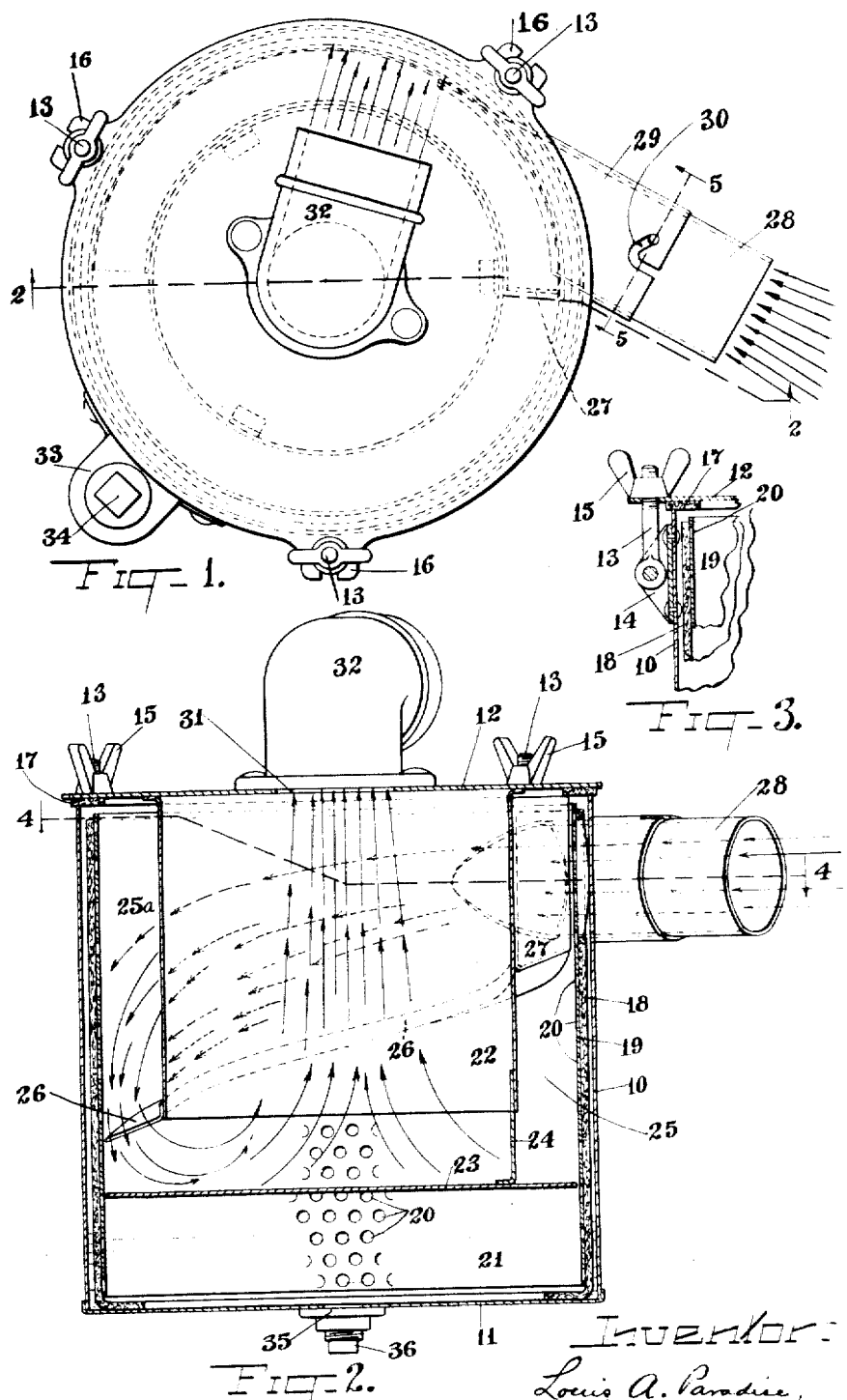

Patented Aug. 11, 1931

1,818,742

UNITED STATES PATENT OFFICE

LOUIS A. PARADISE, OF MOLINE, ILLINOIS, ASSIGNOR TO DEERE AND COMPANY, OF MOLINE, ILLINOIS, A CORPORATION OF ILLINOIS

APPARATUS FOR CLEANING AIR

Application filed May 5, 1924. Serial No. 711,282.

My invention has to do with the removal of solid particles, such as dust from the air supply of internal combustion motors, or from air used for any other purpose where the presence of such particles is objectionable, and has for its primary object to provide an improved apparatus for doing such work. It is also my object to provide such an apparatus which will be well adapted for use in connection with internal combustion motor operated farm tractors, in the operation of which the removal of dust from the air supplied to the carburetor is an important consideration, since they are operated under conditions in which the air is very apt to be dusty, and consequently unless the dust is removed from the air supplied to the motor serious damage is apt to result. I accomplish the aforesaid objects in the manner hereinafter described and as illustrated in the accompanying drawings, which represent one form of apparatus by which the process hereinafter described may be practiced. What I regard as new is set forth in the claims.

Air cleaners of various kinds have heretofore been produced, the more common forms being those operating on the centrifugal principle, in which the dust is separated from the air by centrifugal action and is then allowed to settle by gravity into a receiver, and those operating on the principle of a filter, the air being caused to pass through a mass of straining or filtering material, such as curled hair, excelsior, etc. In air cleaners of the latter class it has also been proposed to moisten the filtering material with oil so that it will better retain the dust particles. While the latter form of apparatus is effective until the filtering material becomes more or less clogged by the accumulation of dust therein, it soon becomes ineffective for use where a uniform air supply is required, as is the case with internal combustion motors, because the clogging of the filtering material impedes the flow of air through it and interferes with the proper operation of the carburetor. My invention involves a distinct departure from either of the earlier principles above referred to, in that it does not contemplate the passage of the air to be cleaned through filtering material, or the removal by gravity of dust particles separated from the air by centrifugal action, but consists in causing the air to be cleaned to flow along, but not through, an adherent surface adapted to arrest and retain any solid particles carried by the air that may come into contact with it. Consequently the flow of the air is not in any wise impeded, and when used in connection with the carburetor of an internal combustion motor the action of the carburetor is not affected. The particles removed from the air are held by the adherent surface so that they cannot get back into the air stream and again contaminate it. My invention further consists in directing the solid particles carried by the air against the adherent surface, as by centrifugal action, as the air stream flows along such surface, thereby insuring complete cleansing of the air. It also consists in providing as the adherent surface a plate covered with a film of a suitable liquid, such as oil, capable of entraining the dust particles brought into contact with it, and, as a further step, in constantly maintaining the supply of liquid, applied to such surface, whereby the effective adherent surface, comprising the original moistened surface of the plate together with the dust particles adhering to or entrained by it, is always kept moist so that the process may be carried on continuously. The liquid used may be motor oil, such for example as the refuse oil drawn from the crank case of an internal combustion motor, or any other suitable liquid capable of being supplied to the apparatus by capillary action, and having sufficient viscosity to adapt it to take up and retain the dust particles.

In the operation of my improved apparatus the air to be cleaned is caused to flow through a duct or chamber in which is a surface, such as one or more of the walls of the chamber, along which the air stream flows, on which surface is a film of the dust entraining liquid which is constantly replenished so that the dust particles taken up by the liquid are themselves moistened sufficiently to enable them to serve as a part of the adherent surface, which is thus constantly This arrangement is provided so that if desired the air intake pipe may be in the form of a fixture associated with the exhaust manifold of a motor in such manner that the air drawn in through said pipe will be heated by the exhaust, and nevertheless the removal or replacement of the air cleaner without disturbing the air intake pipe may readily be accomplished. An opening 31 is formed in the lid 12 which communicates with a tube 32 secured upon the upper surface of the lid over said opening, as shown in Figs. 1 and 2. Said tube is adapted to be connected with the carburetor of a motor, or may conduct the cleaned air to any other desired point, depending on the use to which the apparatus is put.

Assuming the cleaner to be connected with the carburetor of an internal combustion motor, from the foregoing description it will be apparent that the suction of the motor pistons will cause a pulsating flow of air through the apparatus and that the air to be cleaned will pass tangentially into the upper end of the spiral duct 25ᵃ, and after flowing therethrough to the termination of the partition 26 will be permitted to flow around the rest of the chamber or duct 25, and around the lower margin of the cylinder 22, rising through said cylinder to the outlet opening 31, and passing out through the outlet pipe 32. In the course of the air through the chamber or duct 25 the dust particles will be brought into contact with the adherent surface formed by the oil moistened concave inner face of the cylindrical member 19, this operation being promoted by the whirling action imparted to the air stream by its passage into and through the spiral duct 25ᵃ, and consequently will be entrained by the oil film and permanently removed from the air stream, but the flow of air will not be at all impeded. By compelling the air to pass downwardly around the lower edge of the cylinder 22 and thence upwardly within said cylinder to the outlet opening 31 there is produced a sharp reversal in the air flow which tends to cause a gravitational and inertia separation of the dust particles, supplementary to the separating action of the adherent surface 19. As the dust accumulates on the adherent surface of the cylindrical member 19 each particle of dust will be moistened by the constant supply of liquid maintained by the wick and such dust particles in turn will become parts of the adherent surface and serve to entrain other dust particles. When the accumulating mass of dust reaches objectionable proportions, the thumb nuts 15 are loosened and the sleeve 29 is disconnected from the air intake pipe 28, permitting the casing to be lowered, whereupon the plate 23, which is held in a fixed position by the cylinder 22, will scrape from the inner surface of the cylindrical member 19 the dust that has accumulated thereon. The plate 23 may then be cleansed and the parts reassembled ready for further use.

While the whirling action imparted to the air stream by the spiral formation of the air duct 25ᵃ is advantageous because it causes the air particles to be thrown outward into contact with the adherent surface of the cylindrical member 19, my invention, in its broadest form, may be embodied in other forms of apparatus in which centrifugal action is not utilized for that purpose, as all that is necessary is that means be provided by which the dust particles carried by the air current will be brought into contact with the adherent surface while the air flows along such surface, and without compelling the air to flow through it.

For conveniently supplying oil to the bottom of the casing, it is provided with a filler connection 33 that extends through the wall thereof and is closed by a plug 34, shown in Figs. 4 and 6, and for removing the oil from the casing the bottom 11 is provided with a drain opening 35 adapted to be closed by a plug 36, as shown in Fig. 2.

It will be understood that the liquid used to moisten the inner face of the cylindrical member 19 should be of sufficient fluidity so that it will flow along the wick by capillary attraction, and have a tendency to spread through the openings 20 and over the interior surface of the cylindrical member 19 with which the dust laden air comes in contact.

So far as I am aware, I am the first in the art to provide for removing solid particles from air in the manner above described, and the claims hereinafter made are therefore to be construed generically except in so far as they may be directed to specific features of the construction shown and described.

What I claim as my invention and desire to secure by Letters Patent, is—

1. An air cleaning device comprising a spiral air duct having a smooth metallic surface along which the air to be cleaned flows in passing through said duct, and means disposed about the outer periphery on said duct for moistening said surface with a suitable liquid adapted to arrest and retain solid particles carried by the air.

2. An air cleaning device comprising a spiral air duct having a perforated surface exposed to the air passing therethrough, and a wick outside of said duct in juxtaposition to said surface for supplying a suitable liquid thereto through the perforations thereof.

3. An air cleaning device comprising a continuous spiral air duct having a concave perforated wall one surface of which is exposed to the air passing therethrough, and a wick in juxtaposition to the opposite surface of said wall for supplying liquid to the first mentioned surface thereof through the perforations therein.

4. An air cleaning device comprising a casing forming a chamber having inlet and outlet openings, a cylindrical member in said chamber, the inner surface of which is exposed to the air flowing therethrough, means forming with said cylindrical member a spiral duct extending from said inlet opening and discharging into said chamber, and means outside of said duct for supplying a suitable liquid to the inner surface of said cylindrical member.

5. An air cleaning device comprising a casing forming a closed chamber having inlet and outlet openings, a cylindrical member in said casing having an exposed viscid surface film thereon adapted to arrest and retain solid particles carried by the air, means forming with said cylindrical member a tapered spiral duct extending from said inlet opening and discharging into said chamber, a portion of the inner face of said cylindrical member forming one of the walls of said duct, said spiral duct opening downwardly as a means for compelling air to pass downwardly thru said duct and likewise, discharge downwardly therefrom in its course of travel through said cleaning device.

6. An air cleaning device comprising a cylindrical casing forming a closed chamber having inlet and outlet openings, a perforated cylindrical member concentrically disposed therein, and a wick surrounding said cylindrical member and adapted to supply liquid to the inner face thereof through the perforations therein.

7. An air cleaning device comprising a casing forming a closed chamber having inlet and outlet openings, a perforated cylindrical member therein, a wick surrounding said cylindrical member and adapted to supply liquid to the inner face thereof through the perforations therein, and means for causing the air to whirl in passing through said chamber from the inlet to the outlet thereof.

8. An air cleaning device comprising a casing forming a closed chamber having inlet and outlet openings, a cylindrical member in said casing provided with an exposed viscid surface film thereon adapted to arrest and retain solid particles carried by the air, a cylinder in said casing of less diameter than said cylindrical member, and a transverse partition cooperating with said cylinder and cylindrical member to form a spiral duct leading from said inlet opening into said chamber.

9. An air cleaning device comprising a casing, a cover plate therefor, forming a closed chamber in said casing, means detachably connecting said cover plate with said casing, a cylindrical member in said casing having an adherent surface, inlet and outlet openings communicating with said chamber, and means connected with the cover plate adapted to scrape the inner surface of said cylindrical member when said casing is moved away from said cover plate.

10. An air cleaning device comprising a casing, a cover plate therefor and cooperating therewith to form a closed chamber, inlet and outlet openings communicating with said chamber, means detachably connecting said casing with said cover plate, a cylindrical member in said casing having an adherent surface, a cylinder depending from said cover plate within and spaced apart from said cylindrical member, a spirally arranged partition between said cylindrical member and said cylinder extending from said inlet opening to the interior of said chamber, and a plate carried by said cylinder and adapted to scrape the adherent surface of said cylindrical member when the casing is removed from said cover plate.

11. An air cleaning device comprising a casing, a cover plate therefor and cooperating therewith to form a closed chamber, inlet and outlet openings communicating with said chamber, means detachably connecting said casing with said cover plate, a cylindrical member in said casing having an adherent surface, a cylinder depending from said cover plate within and spaced apart from said cylindrical member, a spirally arranged partition between said cylindrical member and said cylinder extending from said inlet opening to the interior of said chamber, a plate carried by said cylinder and adapted to scrape the adherent surface of said cylindrical member when the casing is removed from said cover plate, a sleeve secured to said casing over said inlet opening, and an inlet pipe detachably connected with said sleeve.

12. An air cleaning device comprising an air duct having a stationarily mounted metallic surface exposed directly to the impingement of the air passing through said duct, an external wick for constantly supplying a suitable liquid to said metallic surface, and scraper means supported on a removable wall within said cleaning device operated by the removal of said wall for scraping said metallic surface.

13. An air cleaning device comprising a casing forming a chamber having inlet and outlet openings, a cylindrical member in said chamber the inner surface of which is exposed to the air flowing therethrough, a separable section cooperating with said cylindrical member to form a spiral duct extending from said inlet opening and discharging into said chamber, said cylindrical member being coated with a film of viscid liquid to arrest and retain solid particles carried by the air, and means consisting of a circular flat plate the edge of which contacts the inner surface of the cylindrical member, said plate being supported by legs depending from a separable section of the spiral air duct, the removal of the said separable section causing the circular flat plate to scrape the accumulated dust from the coated surface of the cylindrical member.

14. An air cleaning device comprising a casing forming a closed chamber having an inlet opening, a hollow cylinder in said casing having its lower end open, means defining a spiral air duct between said cylinder and said casing and with which said inlet opening communicates tangentially, said air duct having a film of viscid liquid on its surface against which dust particles in the air stream are caused to impinge by centrifugal force set up in said duct, wick means for supplying a suitable liquid to said exposed surface, and an outlet opening communicating with the upper end of said hollow cylinder whereby after the air is discharged from said spiral duct it is caused to pass downwardly around the lower edge of said cylinder and thence upwardly therein for securing a gravitational separation of dust particles from the air.

15. An air cleaning device comprising an air duct having a normally fixed wall and a removable section, coacting therewith, the surface of the fixed wall being coated with a suitable viscid liquid along which the air to be cleaned flows in passing thru the duct, a circular disc carried by the removable section contacting with said fixed wall, said circular disc forming a partition in the cleaning device and constituting a means for cleaning the coated surface of the fixed wall when the removable duct section is withdrawn.

16. An air cleaning device comprising an air duct, one of the sides of which is automatically coated with a viscid liquid along which the air to be cleaned flows in passing through said duct, said duct comprising a separable inner section supporting a scraping disc in contact with said coated surface of the said duct, said disc removing said viscid liquid on removal of the said separable inner section of the said duct.

17. An air cleaning device comprising an air duct having a stationary concave surface coated with a viscid liquid along which the air to be cleaned flows in passing through said duct, a removable section defining said duct and supporting a partition contacting with said concave surface, said partition comprising means operated by the removal of said removable section for scraping and cleaning said concave surface.

18. An air cleaning device comprising an air duct having a stationary surface exposed to the air and dirt passing therethrough, means for constantly supplying a suitable liquid to said surface, a removable inner unit constituting a part of the cleaning device comprising a cylindrical element forming the inside wall of the said duct and an independent partition carried by the cylindrical element forming the bottom of the air chamber in the cleaning device, said partition being operated by the removal of the inner unit to remove the liquid and accumulated dirt and grit from said stationary surface of the air duct.

19. An air cleaning device comprising a casing forming a closed chamber having inlet and outlet openings, a spiral air duct concentrically disposed within said casing communicating with said inlet opening, said spiral duct comprising a stationary wall and a separable concentric inner partition coacting with said stationary wall, said stationary wall being automatically moistened with a suitable viscid liquid against which the air is caused to impinge through the whirling motion imparted thereto by the spiral duct, a circular flat partition supported by legs depending from said separable inner partition of the spiral duct contacting the stationary wall, said spiral duct opening downwardly forcing the air downwardly against the flat partition where it is abruptly reversed passing upwardly thru the opening formed within the spiral duct encircling the casing, affording a gravitational and inertia separation of dust particles subsequent to the removal of a greater part of the dust by the moistened surface of the stationary wall, said circular flat partition affording a means for collecting dust removed thru gravitational separation and a means for scraping and cleaning the moistened surface of the stationary wall on removal of the inner separable partition of said spiral duct, the total accumulation of dust being removable from said flat partition after the removal of the said partition from the air cleaning device.

20. An air cleaning device comprising a spiral air duct having a smooth non-absorbent surface against which the air to be cleaned is directed, and wick means for moistening said surface with a suitable liquid adapted to arrest and retain solid particles carried by the air.

21. An air cleaning device comprising a spiral air duct having a surface along which the air to be cleaned flows in passing through said duct, means outside of said duct for moistening said surface with a suitable liquid adapted to arrest and retain solid particles carried by the air, and means comprising a partition within said cleaning device attached to a removable portion of the device and thereby held against said surface, said means operated by the removing of said removable portion to clean said surface.

22. An air cleaning device comprising an air duct having a concave surface exposed to the air passing therethrough, means for supplying a suitable liquid to said surface, and means conforming with said concave surface and supported from a separable portion of said air duct, said means actuated by the opening of said cleaning device for cleansing said surface.

23. An air cleaning device comprising an air duct having a stationary perforated metallic wall against which the air impinges in passing through said duct, external means for constantly supplying a suitable liquid to said metallic wall, means for cleaning said perforated wall, said wall cleaning means being supported on a removable wall within said air cleaning device and operated automatically upon the opening of said air cleaning device for cleaning said perforated wall.

24. An air cleaning device having a quantity of viscid liquid at the bottom thereof, an air duct, one of the sides of said air duct being automatically coated with said viscid liquid to clean the air passing through said duct, said duct comprising a separable inner section supporting a scraping disc in contact with said coated surface of said duct, said disc removing said viscid liquid coating on removal of the separable inner section of the duct, and said disc comprising a baffle for preventing the circulating air from contacting the viscid liquid disposed at the bottom of said cleaning device.

25. An air cleaning device having a quantity of viscid liquid at the bottom thereof, an air duct, one of the sides of said air duct being automatically coated with said viscid liquid to clean the air passing through said duct, said duct comprising a separable inner section supporting a scraping disc in contact with said coated surface of said duct, said disc removing said viscid liquid coating on removal of the separable inner section of the duct, and said disc comprising a baffle centering means to gauge and center the separable inner section of the duct within the cleaning device.

LOUIS A. PARADISE.

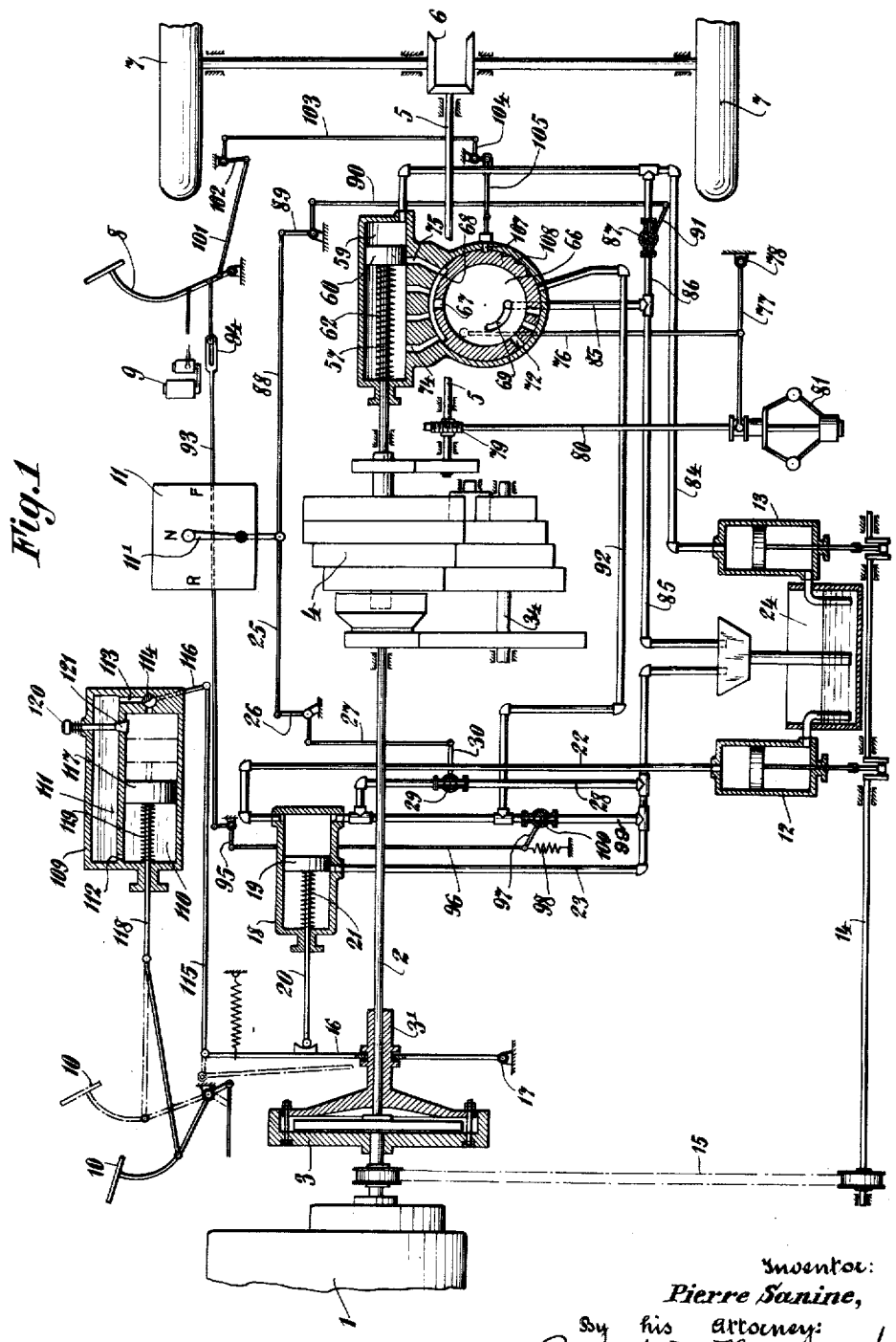

tion of said air duct, said means actuated by the opening of said cleaning device for cleansing said surface.

23. An air cleaning device comprising an air duct having a stationary perforated metallic wall against which the air impinges in passing through said duct, external means for constantly supplying a suitable liquid to said metallic wall, means for cleaning said perforated wall, said wall cleaning means being supported on a removable wall within said air cleaning device and operated automatically upon the opening of said air cleaning device for cleaning said perforated wall.

24. An air cleaning device having a quantity of viscid liquid at the bottom thereof, an air duct, one of the sides of said air duct being automatically coated with said viscid liquid to clean the air passing through said duct, said duct comprising a separable inner section supporting a scraping disc in contact with said coated surface of said duct, said disc removing said viscid liquid coating on removal of the separable inner section of the duct, and said disc comprising a baffle for preventing the circulating air from contacting the viscid liquid disposed at the bottom of said cleaning device.

25. An air cleaning device having a quantity of viscid liquid at the bottom thereof, an air duct, one of the sides of said air duct being automatically coated with said viscid liquid to clean the air passing through said duct, said duct comprising a separable inner section supporting a scraping disc in contact with said coated surface of said duct, said disc removing said viscid liquid coating on removal of the separable inner section of the duct, and said disc comprising a baffle centering means to gauge and center the separable inner section of the duct within the cleaning device.

LOUIS A. PARADISE.

CERTIFICATE OF CORRECTION.

Patent No. 1,818,742.  Granted August 11, 1931, to

LOUIS A. PARADISE.

It is hereby certified that error appears in the printed specification of the above numbered patent requiring correction as follows: Page 4, line 124, claim 13, after "liquid" insert adapted; page 6, line 39, claim 25, strike out "baffle"; and that the said Letters Patent should be read with these corrections therein that the same may conform to the record of the case in the Patent Office.

Signed and sealed this 22nd day of September, A. D. 1931.

(Seal)

M. J. Moore,
Acting Commissioner of Patents.

CERTIFICATE OF CORRECTION.

Patent No. 1,818,742.  Granted August 11, 1931, to

LOUIS A. PARADISE.

It is hereby certified that error appears in the printed specification of the above numbered patent requiring correction as follows: Page 4, line 124, claim 13, after "liquid" insert adapted; page 6, line 39, claim 25, strike out "baffle"; and that the said Letters Patent should be read with these corrections therein that the same may conform to the record of the case in the Patent Office.

Signed and sealed this 22nd day of September, A. D. 1931.

(Seal)

M. J. Moore,
Acting Commissioner of Patents.